May 22, 1934.    E. G. K. ANDERSON    1,959,607
THREADLESS PIPE COUPLING
Filed Feb. 25, 1932
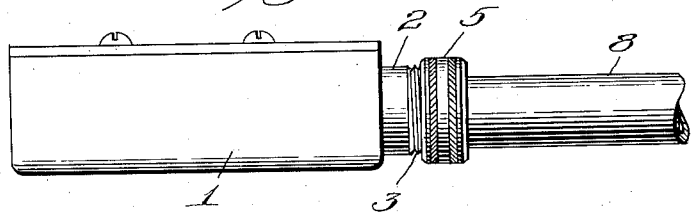
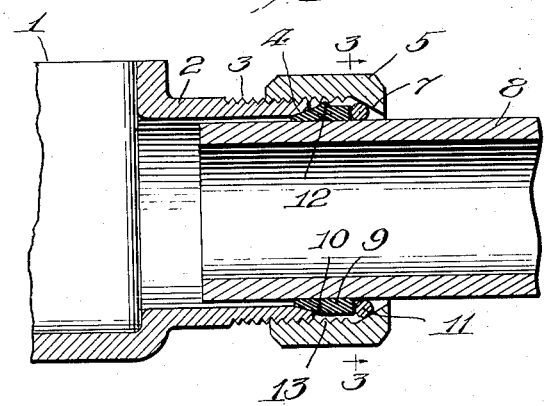
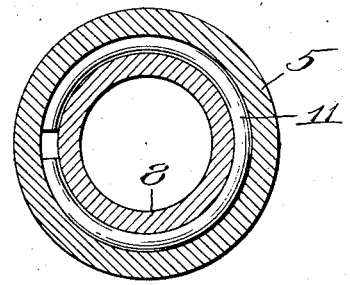
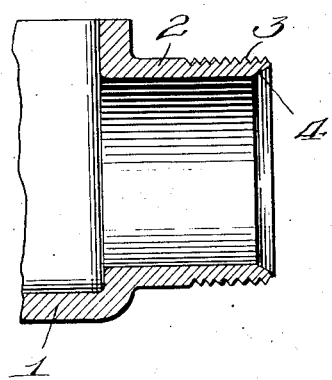
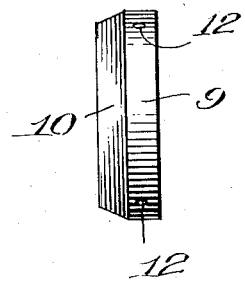
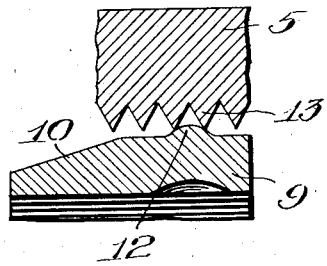
Inventor:
E. G. K. Anderson,
by Wm. F. Freudenreich,
Atty Patented May 22, 1934

1,959,607

UNITED STATES PATENT OFFICE 1,959,607

THREADLESS PIPE COUPLING

Ernst G. K. Anderson, Evanston, Ill., assignor to Appleton Electric Company, a corporation of Illinois Application February 25, 1932, Serial No. 595,159

3 Claims. (Cl. 285—123)

The object of the present invention is to produce a simple and novel construction and arrangement for coupling a pipe or the like to a surrounding tubular element which may or may not be a part of a connection box, whereby a secure mechanical connection is obtained and the joint between the pipe and the tubular element is effectively sealed.

This application is in part a continuation of my prior application, Ser. No. 585,650, filed January 9, 1932.

The various features of novelty whereby my invention is characterized will hereinafter be pointed out with particularity in the claims; but, for a full understanding of my invention and of its objects and advantages, reference may be had to the following detailed description taken in connection with the accompanying drawing, wherein:

Figure 1 is a side view of a connection box and a fragment of a pipe coupled thereto in accordance with the present invention; Fig. 2 is a longitudinal section taken on a plane passing through the long axis of the pipe, showing, on a larger scale, fragments of the pipe and box, together with the coupling; Fig. 3 is a section on line 3—3 of Fig. 2; Fig. 4 is a view on the same plane as Fig. 2, showing the same fragment of the box appearing in Fig. 2; Fig. 5 is an edge view of the sealing ring adapted to be set into the frusto-conical end of the tubular element in Fig. 4; and Fig. 6 is a section on the same plane as Fig. 2, but on a much larger scale, showing fragments of the sealing ring and the surrounding projection on the box.

In the drawing, I have illustrated my invention as applied to a coupling between a threadless pipe and a connection box and, for the sake of brevity, I shall confine the detailed description to this particular embodiment, although it will, of course, be understood that my invention is applicable to the coupling together of any two telescoped members to one of which I shall hereinafter refer as a pipe, although it need not be tubular in form.

Referring to the drawing, 1 represents a connection box from one wall of which extends an outward tubular projection 2 that forms an inlet into the interior of the box. The part 2 is externally screw-threaded, as indicated at 3, and has at its free end a reentrant frusto-conical face 4. Screwed upon the member 2 is a cup-shaped nut 5 having in the bottom wall a large central opening 6 of about the same diameter as the internal diameter of the member 2. Between the cylindrical wall and the bottom wall of the nut is a fillet so shaped as to produce a frusto-conical face 7 opposed to the frusto-conical face 4. In other words, the conical elements of the faces 4 and 7 are inclined in opposite directions from a transverse plane lying between such faces.

A member 8, which I shall call a pipe, is inserted through the opening 6 in the nut and into the tubular member 2. In accordance with my invention, the pipe is caused to be securely locked to the tubular member and the joint between the pipe and this member to be effectively sealed, by the act of screwing the nut tight. To this end I associate with the parts heretofore described, a pair of rings that surround the pipe within the chamber of the nut; one ring serving to produce a seal and the other ring acting as a pipe-gripping element; and each ring serving as an abutment for the other while the nut is being tightened. One of the rings 9 is a solid band-like element of metal that is more or less ductile, although it is preferably comparatively hard. I have found that this ring may advantageously be made of brass. The internal diameter of the ring is such that it will fit rather closely about the pipe, although being freely movable on the same. One end of the ring has an external taper, giving that part of the ring the shape of a frustum of a cone 10. At the other end of the ring there is preferably a flat end face lying in a plane at right angles to the central axis of the ring. The second ring 11 is divided and is of a diameter, when closed, that is less than that of the pipe to which it is to be applied. This ring is conveniently made of a wire of comparatively hard material and of a diameter slightly greater than the radial thickness of the material of the ring 9; and it may also be resilient, which it will ordinarily be, if composed of a material that is hard enough not to flow perceptibly under the pressures to which the ring will be subjected in use.

When the pipe is to be coupled to the box, first the ring 11 and then the ring 9, butt end first, are slipped on the end of the pipe which has already been inserted through the nut. The end of the pipe is then entered in the tubular part 2 on the box and the nut is pushed along, carrying the two rings with it, until the threads in the nut engage the threads on the tubular part 2. Then, as the nut is screwed on, the two rings, pressed against each other, are clamped between the two opposed frusto-conical faces 4 and 7 which tend to compress the rings radially. Since the metal at the extreme end of the frusto-conical portion of the solid ring is comparatively thin, it will be caused to flow under the pressure to which it is subjected, setting itself in intimate contact with the pipe and also with the surrounding frusto-conical face 4. The metal of the ring 11 will ordinarily not flow to any considerable extent, but, since the ring is divided, it will contract, and be caused tightly to grip the pipe. With this construction, the wire ring effectively locks the pipe to the box, whereas the other ring constitutes, as it were, a packing for the joint between the pipe and the box. In short, since each of the two rings serves a different purpose, each ring may be so shaped and be of such a material as best to adapt it to serve its own purpose and, therefore, the mechanical securing of the pipe and the sealing of the joint may be done much more successfully than where it is sought to effect both ends by a single means.

It is desirable that the two rings be held in the nut against dropping out while the nut remains detached from the box. To this end I form on the exterior of the cylindrical part of the ring 9 one or more, preferably three, little knobs or projections 12. These knobs or projections increase the effective diameter of the ring to such an extent that it must be pushed forcibly into the nut in order to be able to pass the threads 13 in the nut; the knob engaging the crests of the threads in the nut, as shown in Fig. 6, and causing the ring to spring toward the center at the points where the projections occur before the projections can pass the threads. These knobs or projections may be produced by pressing or punching the metal of the ring outwardly from the inside of the ring.

While I have illustrated and described with particularity only a single preferred form of my invention, I do not desire to be limited to the exact structural details thus illustrated and described; but intend to cover all forms and arrangements which come within the definitions of my invention constituting the appended claims.

I claim:

1. In combination, a box having a tubular projection externally screw-threaded and provided with a re-entrant frusto-conical face, a cup-shaped nut screwed upon said projection, said nut having in the bottom wall a central opening of about the same diameter as the internal diameter of the projection, said nut having at the juncture of the cylindrical wall and the bottom wall a frusto-conical face coaxial with but oppositely disposed with respect to the other frusto-conical face, a solid metal ring of more or less ductile metal within the nut and having a frusto-conical end engaged with the frusto-conical face on said projection, a divided wire ring abutting against the outer end of the solid ring and engaged with the frusto-conical face on the nut, the wire of which the latter ring is composed being of a diameter somewhat greater than the thickness of the material of the solid ring.

2. In combination, a box having a tubular projection externally screw-threaded and provided with a re-entrant frusto-conical face, a cup-shaped nut screwed upon said projection, said nut having in the bottom wall a central opening of about the same diameter as the internal diameter of the projection, said nut having at the juncture of the cylindrical wall and the bottom wall a frusto-conical face coaxial with but oppositely disposed with respect to the other frusto-conical face, a solid metal ring of more or less ductile metal within the nut and having a frusto-conical end engaged with the frusto-conical face on said projection, a divided wire ring abutting against the outer end of the solid ring and engaged with the frusto-conical face on the nut, said solid ring having small peripheral knobs or projections which give that ring an effective diameter greater than the internal diameter of the nut at the crests of the threads in the latter.

3. In combination, a box having a tubular projection externally screw-threaded and provided with a re-entrant frusto-conical face, a cup-shaped nut screwed upon said projection, said nut having in the bottom wall a central opening of about the same diameter as the internal diameter of the projection, said nut having at the juncture of the cylindrical wall and the bottom wall a frusto-conical face coaxial with but oppositely disposed with respect to the other frusto-conical face, a solid metal ring of more or less ductile metal within the nut and having a frusto-conical end engaged with the frusto-conical face on said projection, means on the aforesaid ring cooperating with the threads in the nut yieldingly to lock the ring in the nut, and a divided wire ring abutting against the outer end of the solid ring and engaged with the frusto-conical face on the nut.

ERNST G. K. ANDERSON.